United States Patent
Minami et al.

(10) Patent No.: US 8,549,170 B2
(45) Date of Patent: Oct. 1, 2013

(54) RETRANSMISSION SYSTEM AND METHOD FOR A TRANSPORT OFFLOAD ENGINE

(75) Inventors: John Shigeto Minami, Honolulu, HI (US); Michael Ward Johnson, Livermore, CA (US); Andrew Currid, Alameda, CA (US); Mrudula Kanuri, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 3262 days.

(21) Appl. No.: 10/741,978

(22) Filed: Dec. 19, 2003

(65) Prior Publication Data

US 2005/0149632 A1 Jul. 7, 2005

(51) Int. Cl.
*G06F 15/16* (2006.01)

(52) U.S. Cl.
USPC .......................................... 709/237; 709/236

(58) Field of Classification Search
USPC .................................................. 709/237, 236
See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | 364/200 |
| 4,839,851 A | 6/1989 | Maki | 364/900 |
| 5,012,489 A | 4/1991 | Burton et al. | 375/8 |
| 5,056,058 A | 10/1991 | Hirata et al. | 364/900 |
| 5,161,193 A | 11/1992 | Lampson et al. | 380/49 |
| 5,163,131 A | 11/1992 | Row et al. | 395/200 |
| 5,307,413 A | 4/1994 | Denzer | 380/49 |
| 5,426,694 A | 6/1995 | Herbert | 379/242 |
| 5,430,727 A | 7/1995 | Callon | 370/85.13 |
| 5,440,551 A | 8/1995 | Suzuki | 370/60 |
| 5,455,599 A | 10/1995 | Cabral et al. | 345/133 |
| 5,485,460 A | 1/1996 | Schrier et al. | 370/94.1 |
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,544,357 A | 8/1996 | Huei | 395/600 |
| 5,546,453 A | 8/1996 | Hebert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |
| 5,579,316 A | 11/1996 | Venters et al. | 370/94.1 |
| 5,581,686 A | 12/1996 | Koppolu et al. | 395/340 |
| 5,596,702 A | 1/1997 | Stucka et al. | 395/340 |

(Continued)

FOREIGN PATENT DOCUMENTS

| | | |
|---|---|---|
| AU | 4595297 | 5/1998 |
| AU | 7364898 | 11/1998 |

(Continued)

OTHER PUBLICATIONS

Yeh et al., "Introduction to TCP/IP Offload Engine (TOE)" Version 1.0, Apr. 2002, 10 Gigabit Ethernet Alliance.

(Continued)

*Primary Examiner* — Karen Tang
(74) *Attorney, Agent, or Firm* — Zilka-Kotab, PC

(57) ABSTRACT

A system and method are provided for performing the retransmission of data in a network. Included is an offload engine in communication with system memory and a network. The offload engine serves for managing the retransmission of data transmitted in the network.

24 Claims, 7 Drawing Sheets

(56) References Cited

U.S. PATENT DOCUMENTS

| | | | |
|---|---|---|---|
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,684,954 A | 11/1997 | Kaiserswerth et al. | 395/200.2 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,754,768 A | 5/1998 | Brech et al. | 395/200.6 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/173 |
| 6,061,368 A | 5/2000 | Hitzelberger | 370/537 |
| 6,061,742 A | 5/2000 | Stewart et al. | 709/250 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennet et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden | 713/201 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher et al. | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher et al. | 709/238 |
| 6,247,068 B1 | 6/2001 | Kyle | 709/328 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher et al. | 709/243 |
| 6,389,537 B1 | 5/2002 | Davis et al. | 713/187 |
| 6,393,487 B2 | 5/2002 | Boucher et al. | 709/238 |
| 6,397,316 B2 | 5/2002 | Fesas, Jr. | 711/200 |
| 6,427,169 B1 | 7/2002 | Elzur | 709/224 |
| 6,427,171 B1 | 7/2002 | Craft | 709/230 |
| 6,427,173 B1 | 7/2002 | Boucher | 709/238 |
| 6,430,628 B1 | 8/2002 | Connor | 710/5 |
| 6,434,620 B1 | 8/2002 | Boucher et al. | |
| 6,460,080 B1 | 10/2002 | Shah et al. | 709/224 |
| 6,470,415 B1 | 10/2002 | Starr | 711/104 |
| 6,530,061 B1 | 3/2003 | Labatte | 714/807 |
| 6,591,302 B2 | 7/2003 | Boucher | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher | 709/239 |
| 6,687,758 B2 | 2/2004 | Craft | 709/250 |
| 6,697,868 B2 | 2/2004 | Craft | 709/250 |
| 6,751,665 B2 | 6/2004 | Philbrick | 709/224 |
| 6,757,746 B2 | 6/2004 | Boucher | 709/250 |
| 6,807,581 B1 | 10/2004 | Starr | 709/250 |
| 6,938,092 B2 | 8/2005 | Burns | 709/230 |
| 6,941,386 B2 | 9/2005 | Craft | 709/250 |
| 6,965,941 B2 | 11/2005 | Boucher | 709/230 |
| 6,996,070 B2 | 2/2006 | Starr | 370/252 |
| 7,013,485 B2 | 3/2006 | Brown et al. | |
| 7,042,898 B2 | 5/2006 | Blightman | 370/463 |
| 2001/0004354 A1 | 6/2001 | Jolitz | 370/328 |
| 2001/0021949 A1 | 9/2001 | Blightman et al. | 709/219 |
| 2001/0023460 A1 | 9/2001 | Boucher et al. | 709/250 |
| 2001/0027496 A1 | 10/2001 | Boucher et al. | 709/250 |
| 2001/0036196 A1 | 11/2001 | Brightman | 370/465 |
| 2001/0037397 A1 | 11/2001 | Boucher | 709/230 |
| 2001/0037406 A1 | 11/2001 | Philbrick | 709/250 |
| 2001/0047433 A1 | 11/2001 | Boucher et al. | 709/250 |
| 2001/0047485 A1 | 11/2001 | Brown et al. | |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0101819 A1 | 8/2002 | Goldstone | |
| 2002/0120899 A1 | 8/2002 | Gahan et al. | 714/748 |
| 2002/0147839 A1 | 10/2002 | Boucher et al. | 709/238 |
| 2002/0156927 A1 | 10/2002 | Boucher | 709/250 |
| 2002/0161919 A1 | 10/2002 | Boucher | 709/238 |
| 2002/0163888 A1 | 11/2002 | Grinfeld | 370/235 |
| 2003/0005142 A1 | 1/2003 | Elzur et al. | 709/232 |
| 2003/0005143 A1 | 1/2003 | Elzur et al. | 709/232 |
| 2003/0014544 A1 | 1/2003 | Pettey | 709/249 |
| 2003/0016669 A1 | 1/2003 | Pfister et al. | 370/392 |
| 2003/0031172 A1 | 2/2003 | Grinfeld | 370/389 |
| 2003/0046330 A1 | 3/2003 | Hayes | 709/201 |
| 2003/0046418 A1 | 3/2003 | Raval et al. | 709/237 |
| 2003/0056009 A1 | 3/2003 | Mizrachi et al. | 709/245 |
| 2003/0058870 A1 | 3/2003 | Mizrachi et al. | 370/395.52 |
| 2003/0061505 A1 | 3/2003 | Sperry et al. | 713/200 |
| 2003/0066011 A1 | 4/2003 | Oren | 714/758 |
| 2003/0079033 A1 | 4/2003 | Craft | 709/230 |
| 2003/0084185 A1 | 5/2003 | Pinkerton | |
| 2003/0095567 A1 | 5/2003 | Lo et al. | 370/466 |
| 2003/0115350 A1 | 6/2003 | Uzrad-Nali et al. | 709/231 |
| 2003/0115417 A1 | 6/2003 | Corrigan | 711/118 |

| | | | | |
|---|---|---|---|---|
| 2003/0115485 | A1 | 6/2003 | Milliken | |
| 2003/0128704 | A1 | 7/2003 | Mizrachi et al. | 370/394 |
| 2003/0140124 | A1 | 7/2003 | Burns | 709/220 |
| 2003/0145101 | A1 | 7/2003 | Mitchell et al. | 709/236 |
| 2003/0145270 | A1 | 7/2003 | Holt | 714/766 |
| 2003/0167346 | A1 | 9/2003 | Craft et al. | 709/250 |
| 2003/0200284 | A1 | 10/2003 | Philbrick et al. | 709/219 |
| 2004/0003126 | A1 | 1/2004 | Boucher | 709/250 |
| 2004/0049601 | A1* | 3/2004 | Boyd et al. | 709/250 |
| 2004/0054813 | A1 | 3/2004 | Boucher | 709/250 |
| 2004/0062245 | A1* | 4/2004 | Sharp et al. | 370/392 |
| 2004/0062246 | A1 | 4/2004 | Boucher | 370/392 |
| 2004/0064578 | A1 | 4/2004 | Boucher | 709/236 |
| 2004/0064589 | A1 | 4/2004 | Boucher | 709/250 |
| 2004/0064590 | A1 | 4/2004 | Starr | 709/250 |
| 2004/0073703 | A1 | 4/2004 | Boucher | 709/245 |
| 2004/0078462 | A1 | 4/2004 | Philbrick | 709/224 |
| 2004/0088262 | A1 | 5/2004 | Boucher | 705/65 |
| 2004/0100952 | A1 | 5/2004 | Boucher | 370/389 |
| 2004/0111535 | A1 | 6/2004 | Boucher | 709/250 |
| 2004/0117509 | A1 | 6/2004 | Craft | 709/250 |
| 2004/0158640 | A1 | 8/2004 | Philbrick | 709/230 |
| 2004/0158793 | A1 | 8/2004 | Blightman | 714/758 |
| 2004/0240435 | A1 | 12/2004 | Boucher | 370/352 |
| 2005/0122986 | A1 | 6/2005 | Starr | 370/412 |
| 2005/0141561 | A1 | 6/2005 | Craft | 370/474 |
| 2005/0160139 | A1 | 7/2005 | Boucher | 709/203 |
| 2005/0175003 | A1 | 8/2005 | Craft | 370/389 |
| 2005/0182841 | A1 | 8/2005 | Sharp | 709/228 |
| 2005/0198198 | A1 | 9/2005 | Craft | 709/217 |
| 2005/0204058 | A1 | 9/2005 | Philbrick | 709/238 |
| 2005/0278459 | A1 | 12/2005 | Boucher | 709/250 |
| 2006/0010238 | A1 | 1/2006 | Craft | 709/227 |
| 2007/0062245 | A1 | 3/2007 | Fuller et al. | 72/413 |
| 2008/0095182 | A1* | 4/2008 | Elzur et al. | 370/412 |

FOREIGN PATENT DOCUMENTS

| | | |
|---|---|---|
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |
| CA | 2287413AA | 11/1998 |
| CA | 2328829AA | 12/1999 |
| CA | 2265692 C | 8/2001 |
| CN | 1237295 A | 12/1999 |
| CN | 1266512 T | 9/2000 |
| CN | 1305681 T | 7/2001 |
| EP | 1361512 | 12/2003 |
| EP | 361512 | 11/2005 |
| TW | 447205 B | 7/2001 |
| TW | 448407 B | 8/2001 |
| TW | 487862 B | 5/2002 |
| WO | WO98/21655 | 5/1998 |
| WO | WO 98/35480 | 8/1998 |
| WO | WO 98/50852 | 11/1998 |
| WO | 99/22306 | 5/1999 |
| WO | 99/22306 | 6/1999 |
| WO | WO 99/65219 | 12/1999 |
| WO | WO0013091 A1 | 3/2000 |
| WO | WO 01/13583 | 2/2001 |
| WO | WO 01/28179 | 4/2001 |
| WO | 0161466 A1 | 8/2001 |
| WO | WO 02/27519 | 4/2002 |
| WO | WO 02/39302 | 5/2002 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |
| WO | 2004021150 | 3/2004 |
| WO | 2004/021150 | 11/2004 |
| WO | WO 2005/057945 | 6/2005 |

OTHER PUBLICATIONS

European Search Report from European Application No. 04030037. 8-2415 mailed Jul. 26, 2005.

Office Action from European Application No. 04030037.8-2415 which was mailed Mar. 24, 2006.

Yeh, Eric et al, "Introduction to TCP/IP Offload Engine (TOE)", XP002335957 10 Gigabit Ethernet Alliance, Newport Beach, CA, http://www.cse.ohio-state.edu/~panda/788/papers/1d_gigabit.pdf.

Office Action from European Application No. 04030037.8-2415 which was mailed on Dec. 14, 2006.

Johnson et al., "Internet Tuner", New Media News, http://www.newmedianews.com/020197/ts.sub-inettuner.html, Jan. 1997.

Muller, Raimund, LON-das universelle Netzwerk Elektronik 22-1991.

Abbot, Mark B.; Peterson, Larry L., "Increasing Network Trhoguhput by Integrating Protocol Layers" IEEE 1993.

Wright, Maury, Low-Cost Control LANs Add Automation to Homes, Autos, and Offices EDN-Technology Jul. 20, 1992.

Preston, David J., "Internet Protocols Migrate to Silicon for Networking Devices" Electronic Design Apr. 14, 1997.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Wayner, "Sun Gambles on Java Chops", Bytes, Nov. 1996.

Raz, "Real Time Program Language Accelerator", WO 98/21655, May 1998.

Agrawal et al. "Architecture and Design of the Mars Hardware Accelerator", ACM 1987, pp. 101-107.

Case, "Implementing the Java Virtual Machine", Microprocessor Report, Mar. 1996.

Kitadeya et al., "Matsushita Launches Web TV Internet Connection Terminal", http://www.mei.co.jp/corp/news/official.data/data.dir/en981112-1/en981112-1.html, Nov. 1998.

iReady Product Data Sheet, Internet Tuner.

Johnson et al., "Internet Tuner", New Media News, http://www.newmedianews.com/020197/ts.sub-_inettuner.html, Jan. 1997.

Kelly, T., "Cheap Internet Hardware that Fits in Everything", ZDNet, http://www.zdnet.co.uk/news/1998/44/ns-5998.html, Nov. 1998.

8802-3:2000 ISO/IEC Information Technology, http://www.computer.org/cspress/CATALOG/st01118.htm.

INCITS: Development work conducted in t10-I/O Interface-Lower Level Sep. 30, 2002 Weber, Ralph O.

Stevens, Richard W., "TCP/IP Illustrated Volume" Addison-Wesley Professional Computing Series.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Muller, Raimund, "LON—das universelle Netzwerk" Electronik 22/1991.

Rang, Michael; Tantawy, Ahmed, "A Design Methodology for Protocol Processors" IEEE 1995.

Banks, David and Prudence, Michael, "A High-Performance Network Architecture for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computing Systems, vol. 15, No. 1 Feb. 1997.

Doumenis, Gr.A., Konstantoulakis, G.E., Reisis, D.I.and Stassinopoulos, G.I. "A Personal Computer Hosted Terminal Adapter for the Broadband Integrated Services Digital Network and Applications" National Technical University of Athens, Greece.

Womack, Lucas; Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, " An Analysis of TCP Processing Overhead" IEEE Jun. 1989.

Goloi, W.K.; Behr, P. "An IPC Protocol and Its Hardware Realization for a High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F.; Sebastia, A., "Electronic Design of a High Performance Interfacce to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.

Mansour, Mohammad; Kayssi, Ayman, " FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN# 0-7803-2636-9.

Wright, Maury "Intelligent Ethernet Boards" EDN Jun. 23, 1988.

Preston, David " Intetnet Protocols Migrate to Silicon for Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.

Maly, K.; Khanna, K.; Kukkamala, R.; Overstreet C.M.; Yerraballi, R.; Foundriat, E.C.; Madan, B., "Parallel TCP/IP for Multiprocessor Workstations" High Performance Networking, IV, 1993 IFIP.

Laskman, T.V.; Madhow, U., "Performance Analysis of Window-based Flow Control using TCP/IP:Effect of High Bandwidth Delay Products and Random Loss" High Performance Networking V. 1994 IFIP.

Ramakrishnan, K.K., "Performance Considerations in Designing Network Interfaces" IEEE Journal1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www. newmedianews.com/02197/ts_inettuner. html.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

Eady Product Data Sheet, Internet Tuner.

Luijten, Ronald P., "An OC-12 ATM Switch Adapter Chipset" 1998 IEEE.

"Less-Numerical Algorithms", Ch. 20 p. 888-895.

"Storage Networking Industry Association" iSCSI Building Blocks for IP Storage Networking, www.ipstorage.org.

Tannenbaum, Andrew S., "Structured Computer Organization Fourth Edition" Prentice-Hall International, 1990.

Office Action and Translation from Chinese Application No. 200410104980.6 mailed on Aug. 15, 2008.

Office Action and Translation from Chinese Application No. 200410104980.6 mailed on Feb. 29, 2008.

Notice of Allowance from European Application No. 04030037.8-2415 mailed on Oct. 29, 2007.

Chinese Office Action Summary from application No. 200410104980.6 mailed on Dec. 25, 2009.

Japanese Office Action Summary from application No. 2004-368572 mailed on Apr. 14, 2010 (no English translation).

Office Action from Taiwan Patent Application No. 093139551, dated Apr. 29, 2010.

Final Rejection from Japanese Patent Application No. 2004-368572, dated Sep. 28, 2010.

Decision on Rejection from Chinese Application No. 200410104980.6, dated Nov. 23, 2011.

* cited by examiner

RETRANSMISSION SYSTEM AND METHOD FOR A TRANSPORT OFFLOAD ENGINE

FIELD OF THE INVENTION

The present invention relates to transport offload engines, and more particularly to handling retransmission requests utilizing transport offload engines.

BACKGROUND OF THE INVENTION

Transport offload engines (TOE) include technology that is gaining popularity in high-speed systems for the purpose of optimizing throughput, and lowering processor utilization. TOE components are often incorporated into one of various printed circuit boards, such as a network interface card (NIC), a host bus adapter (HBA), a motherboard; or in any other desired offloading context.

In recent years, the communication speed in systems has increased faster than processor speed. This has produced an input/output (I/O) bottleneck. The processor, which is designed primarily for computing and not for I/O, cannot typically keep up with the data flowing through the network. As a result, the data flow is processed at a rate slower than the speed of the network. TOE technology solves this problem by removing the burden (i.e. offloading) from the processor and/or I/O subsystem.

Exemplary operation 100 of a TOE is set forth in prior art FIG. 1. As shown in the prior art diagram of FIG. 1, a local processor (of any sort) first sends to a TOE a command to transmit data, in order to transmit data corresponding to a transmission control protocol (TCP) connection from the processor having the attached TOE to a remote processor over a network. See operation 102.

Next, in operation 104, the TOE acquires the data, divides it into segments, and adds Ethernet, TCP, and Internet Protocol (IP) headers to each data segment to create a TCP/IP packet corresponding to each segment. Thereafter, the TOE transmits the resulting packets onto the network, as indicated in operation 106.

After the remote processor has received and validated the packets, the remote processor sends acknowledgements (ACKs) back to the local processor indicating how much of the data has been successfully received. Upon receiving an ACK for all the transmitted data (see decision 108), the TOE sends a command complete to the local processor indicating that the transmit command has been completed by the transport function of the TOE. See operation 110. Additional data may then be transmitted, as indicated in operation 112.

For the case in which an ACK is not received by the TOE within a predetermined time after the corresponding packets were sent, indicating an error condition, the TCP data is re-fetched from the TOE's memory. Note operation 114. In operation 116, the TOE can then retransmit some or all of the unacknowledged packets.

Thus, when transmitting data across a packet-switched network, data may be lost and such data must be retransmitted. For this reason, the TOE stores all unacknowledged data. However, with a 10 Gbps link and a possible 200 ms round-trip delay on a wide area network, this could mean that up to 10 Gbps*200 ms, or 2 gigabits, of information must be stored. Unfortunately, this is too much data to be stored in a cost effective manner on an integrated TOE, since integrating on-board memory on the TOE can be costly.

There is thus a need for a cost effective technique for performing network retransmission.

SUMMARY OF THE INVENTION

A system and method are provided for performing the retransmission of data in a network. Included is an offload engine in communication with system memory and a network. The offload engine serves for managing the retransmission of data transmitted in the network.

To accomplish this, the offload engine identifies the data to be retransmitted, retrieves the data to be retransmitted that is stored in the system memory, and retransmits the retrieved data. By utilizing the system memory in such a manner, a cost effective technique for performing network retransmission is provided.

In one embodiment, the offload engine may transmit a status message to a processor to initiate the retrieval of the data to be retransmitted. Optionally, such status message may be transmitted based on the receipt of at least one acknowledgement or lack thereof, based on a timeout, etc. Moreover, the status message may include a handle for a control block for a socket, a sequence number, and/or a retransmit data size associated with the retransmit request.

Moreover, the processor may transmit a retransmit instruction message to the offload engine, in response to the status message. Such retransmit instruction message may include a sequence number, a pointer to a host buffer, etc. It should be noted that the pointer may be maintained by the offload engine and/or the processor.

Optionally, the retransmit instruction message may also include an offset for use with the pointer to identify the data to be retransmitted. Such offset may optionally be included if the data buffer to be retransmitted is only partially acknowledged. Even still, the retransmit instruction message may include a handle for a control block for a socket.

In use, the offload engine may request a direct memory access (DMA) to retrieve the data to be retransmitted, in response to the retransmit instruction message. In response to receipt of the data to be retransmitted, the offload engine may initiate a comparison involving a sequence number. Thereafter, the offload engine may retransmit the data based on the comparison.

It should be noted that the system memory may be coupled to a processor via a bus and/or reside on the processor. Still yet, the offload engine may include a receiver, a poller, memory, a status message generator, a parser, a transmission requester, a DMA queue, a data packet generator, and/or any other desired components.

DETAILED DESCRIPTION

Figure 1:
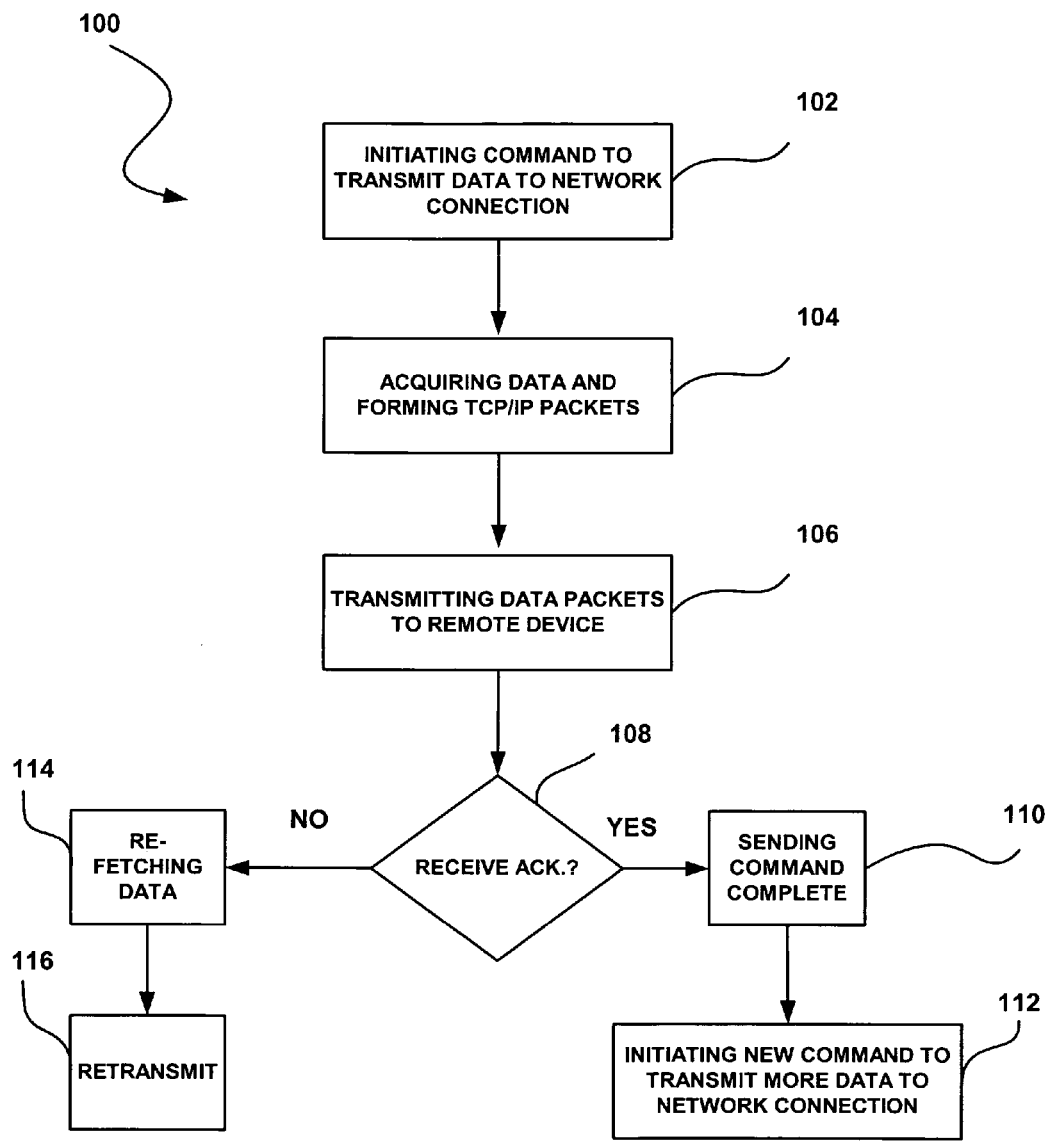
FIG. 1 is a flow chart of a prior art method for transmitting and retransmitting data from a host with an interface device such as an offload engine.
Figure 2:
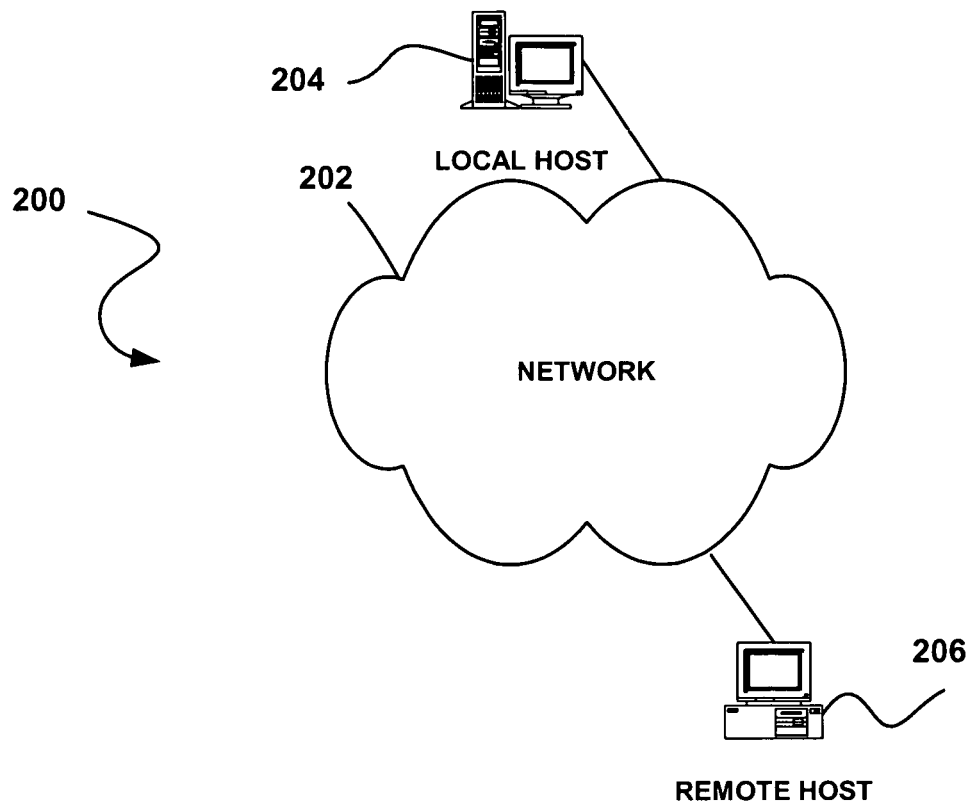
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, etc.

Coupled to the network 202 are a local host 204 and a remote host 206 which are capable of communicating over the network 202. In the context of the present description, such hosts 204, 206 may include a web server, desktop computer, lap-top computer, hand-held computer, printer or any other type of hardware/software. It should be noted that each of the foregoing components as well as any other unillustrated devices may be interconnected by way of one or more networks.

Figure 3:
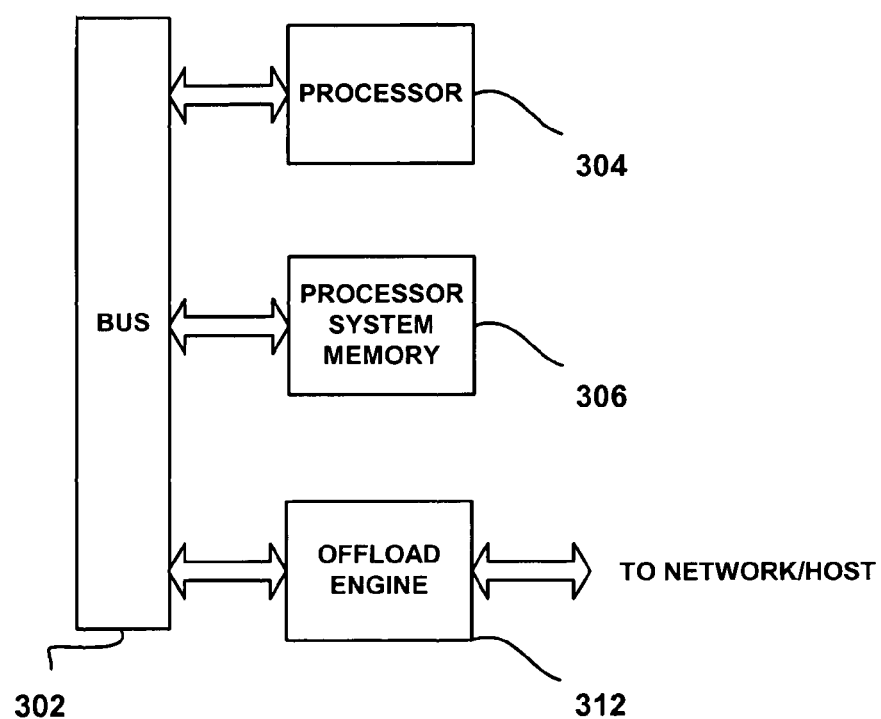
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context.

For example, the architecture 300 may be implemented in the context of a general computer system, a circuit board system, a game console system dedicated for entertainment purposes, a set-top box, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a chipset (i.e. a group of integrated circuits designed to work and sold as a unit for performing related functions, etc.), or any other desired processing device(s) capable of processing data.

Further included is processor system memory 306 which resides in communication with the processor 304 for storing the data. Such processor system memory 306 may take the form of on or off-board random access memory (RAM), a hard disk drive, a removable storage drive (i.e., a floppy disk drive, a magnetic tape drive, a compact disk drive, etc.), and/or any other type of desired memory capable of storing the data.

In use, programs, or control logic algorithms, may optionally be stored in the processor system memory 306. Such programs, when executed, enable the architecture 300 to perform various functions. Of course, the architecture 300 may simply be hardwired.

Further shown is an offload engine 312 in communication with the processor 304 and the network (see, for example, network 202 of FIG. 2). In one embodiment, the offload engine 312 may remain in communication with the processor 304 via the bus 302. Of course, however, the offload engine 312 may remain in communication with the processor 304 via any mechanism that provides communication therebetween. The offload engine 312 may include a transport (i.e. TCP/IP) offload engine (TOE), or any integrated circuit(s) that is capable of managing the data transmitted in the network.

During operation, in order to provide a cost effective technique for performing network retransmission, the offload engine 312 works to identify data to be retransmitted, retrieve the data to be retransmitted that is stored in system memory (see, for example, the processor system memory 306), and retransmit the retrieved data. By using the system memory to store such data that is retransmitted, the offload engine 312 is capable of being manufactured with less or no integrated memory, thus providing a more cost effective technique. More information will now be set forth regarding an exemplary method by which the offload engine 312 utilizes the system memory in the foregoing manner.

Figure 4:
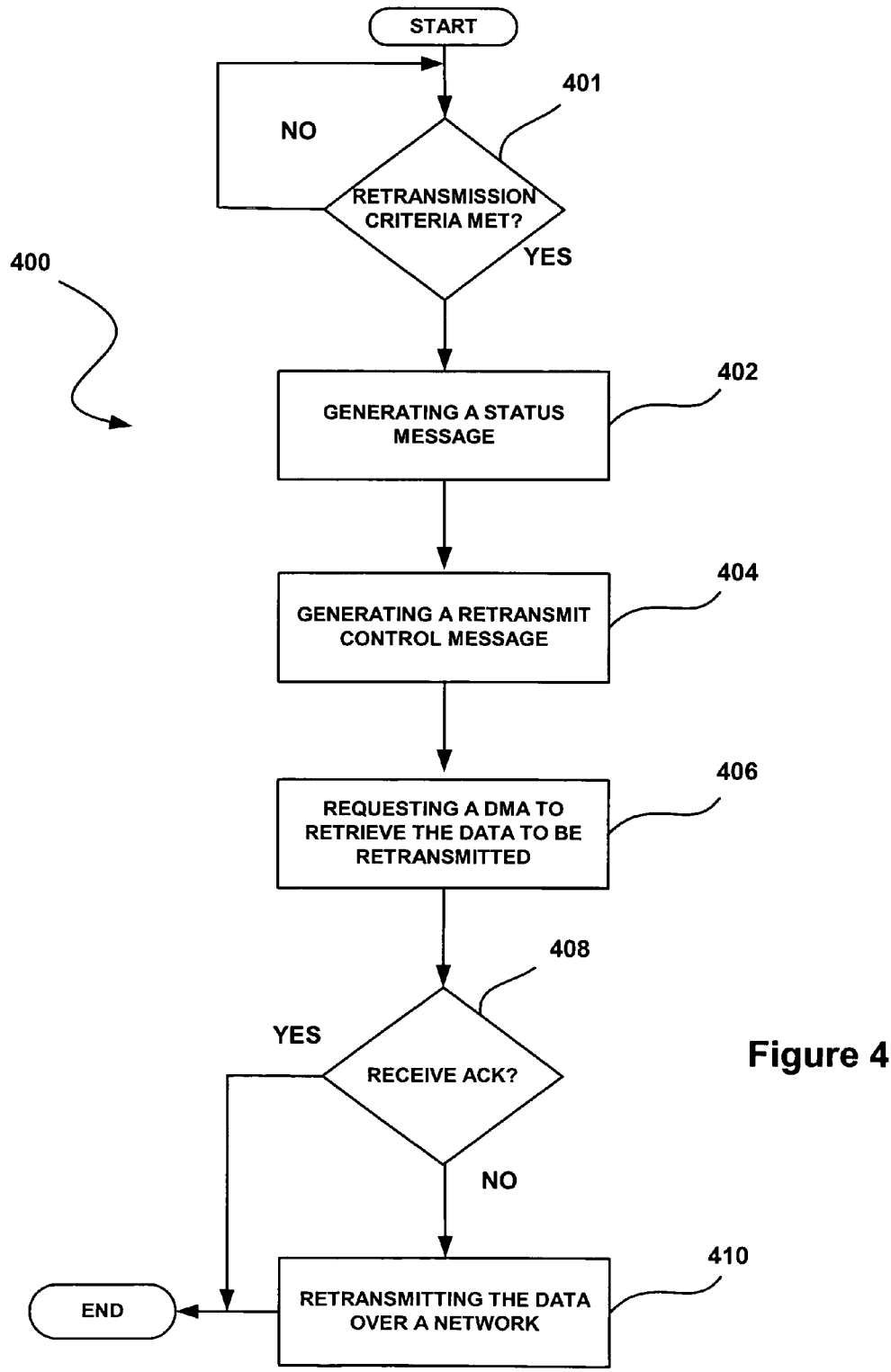
FIG. 4 illustrates an exemplary method for performing the retransmission of data in a network, in accordance with one embodiment.

FIG. 4 illustrates an exemplary method 400 for performing the retransmission of data in a network, in accordance with one embodiment. As an option, the method 400 may be carried out in the context of the exemplary architecture 300 of FIG. 3. Of course, however, it should be noted that the method 400 may be implemented in any desired context. Moreover, while various functions may be attributed to exemplary components (i.e. like those set forth hereinabove), it is important to understand that the various functionality may be carried out by any desired entity.

As shown, in decision 401, it is determined whether criteria have been met to warrant a retransmission of data. Just by way of example, such criteria may be based on at least one acknowledgement (ACK) or lack thereof, a duplicate ACK threshold, a timeout, various timing parameters, and/or any other desired criteria. For instance, in an example where the criteria involve a duplicate ACK threshold, the duplicate ACK threshold may be any predetermined or user-configurable number of ACKs received or any other parameter associated with ACKs. In the context of the present description, ACKs include any signal sent from a receiving host to a transmitting host that indicates that data has been transmitted successfully.

If it is determined that the retransmission criteria has been met, per decision 401, a status message is generated and transmitted to a processor (see, for example, processor 304 of FIG. 3), as indicated in operation 402. In one embodiment, the status message is generated utilizing an offload engine (see, for example, offload engine 312 of FIG. 3). Moreover, the status message may take any form capable of requesting the retransmission of data stored in system memory (see, for example, memory 306 of FIG. 3).

As an option, the status message may include various information to facilitate the request for retransmission of the data. For example, the status message may include a sequence number. In the present context, such sequence number may include a number associated with data that is transmitted, where such number reflects the sequence in which such data was transmitted with respect to other transmitted data.

As a further option, the status message may include a retransmit data size. Typically, the retransmit data size is the largest amount of data, specified in bytes, for example, that a remote host can handle in a single, unfragmented piece. The retransmit data size may also be specified by the remote host in the ACK received by the local host. In this case, multiple TCP packets may be requested for retransmission by the remote host. Still yet, the status message may include a control block (CB) handle for a socket, or any other desired information. It should be noted that the CB may include various information such as information associated with the data that is recently acknowledged.

Table 1 illustrates an exemplary status message format. Such format is set forth for illustrative purposes only, and should not be considered as limiting in any manner.

TABLE 1

| Ver | SB Length | SB Code | CB Handle [15:0] |
|---|---|---|---|
| | | Sequence Number [31:0] | |
| | | — | Retransmit Data Size [15:0] |

Next, in response to the status message, a retransmit instruction message is generated by the processor and transmitted to the offload engine. See operation 404. In the context of the present description, the retransmit instruction message includes any information capable of facilitating retrieval of data to be retransmitted, in the manner that will soon be set forth. More information regarding such retransmit instruction message will be set forth in greater detail during reference to FIG. 5.

In response to the retransmit instruction message, a direct memory access (DMA) is requested by the offload engine. See operation 406. Such DMA is requested to retrieve the data to be retransmitted that is stored in the system memory. It should be noted that, in the context of the present description, DMA is a capability that allows data to be sent directly from memory, such that the processor is freed from involvement with the particular transfer of data, thus speeding up overall operation.

Once the DMA is successfully completed and the data is received, it is then determined whether an ACK was received regarding the instant data, while the various foregoing operations were being carried out. See decision 408. While this may be accomplished in any desired manner, this may optionally be accomplished by initiating a comparison involving the aforementioned sequence number. Specifically, if an ACK bears a sequence number that is greater than the previously collected sequence number, it can be assumed that some or all of the data was successfully received by the remote host.

Thus, based on the foregoing comparison in decision 408, the data is retransmitted over a network, utilizing the offload engine. See operation 410. In particular, if the data was not confirmed to be successfully received, the data can be retransmitted.

Figure 5:
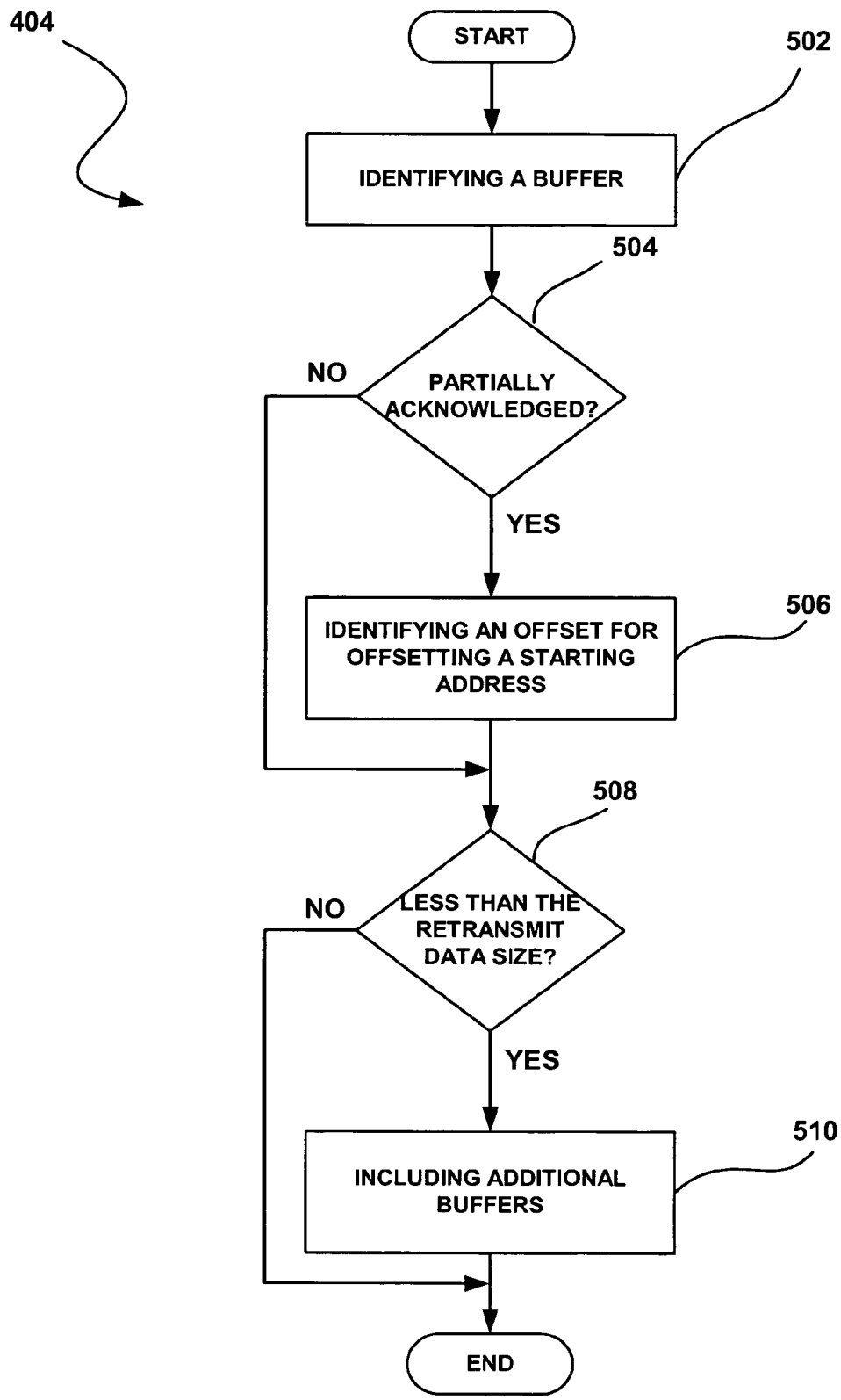
FIG. 5 illustrates an exemplary method for generating a retransmit instruction message, in accordance with one embodiment.

FIG. 5 illustrates an exemplary method 500 for generating a retransmit instruction message, in accordance with one embodiment. As an option, the method 500 may be carried out in the context of operation 404 of FIG. 4. Of course, however, it should be noted that the method 500 may be implemented in any desired context. Moreover, while various functions may be attributed to exemplary components (i.e. like those set forth hereinabove), it is important to understand that the various functionality may be carried out by any desired entity.

As shown, in operation 502, a buffer is identified by a processor (see for example, processor 304 of FIG. 3). The buffer may be identified via the CB handle as shown in the example status message in Table 1. The buffer to be retransmitted is normally the oldest unacknowledged buffer associated with the aforementioned CB handle.

It is then determined in decision 504 whether the buffer has been partially received by the remote host. In other words, it is determined by the processor whether the data in the identified buffer that is to be retransmitted has been partially received in a successful manner. If the data buffer has been at least partially acknowledged, an offset is identified for offsetting a starting address associated with the aforementioned DMA (note operation 406 of FIG. 4). See operation 506. If no offset is required, operation 506 is skipped. Alternatively, the starting address associated with the aforementioned DMA may be modified by the amount of the offset, thereby eliminating the need to transmit a separate offset indicator.

Next, it is determined whether the data is less than the retransmit data size indicated by the aforementioned status message. If this is the case, additional buffers may be included. See operation 510. If not, however, operation 510 is skipped.

Thus, similar to the status message of Table 1, the retransmit instruction message may include various information. For example, a starting address for the DMA operation may be an offset into a scatter-gather list (SGL) associated with the socket. Still further included may be the aforementioned sequence number. Still yet, the retransmit instruction message may include a CB handle for a socket, or any other desired information.

Table 2 illustrates an exemplary retransmit instruction message format. Such format is set forth for illustrative purposes only, and should not be considered as limiting in any manner.

TABLE 2

| Ver | IB Length | IB Code | CB Handle [15:0] |
|---|---|---|---|
| | — | | SGL Offset [15:0] |
| | | Sequence Number [31:0] | |

The retransmit instruction message may therefore be used in operations subsequent to operation 404 of FIG. 4 (see, for example, operations 406-410 of FIG. 4).

Figure 6:
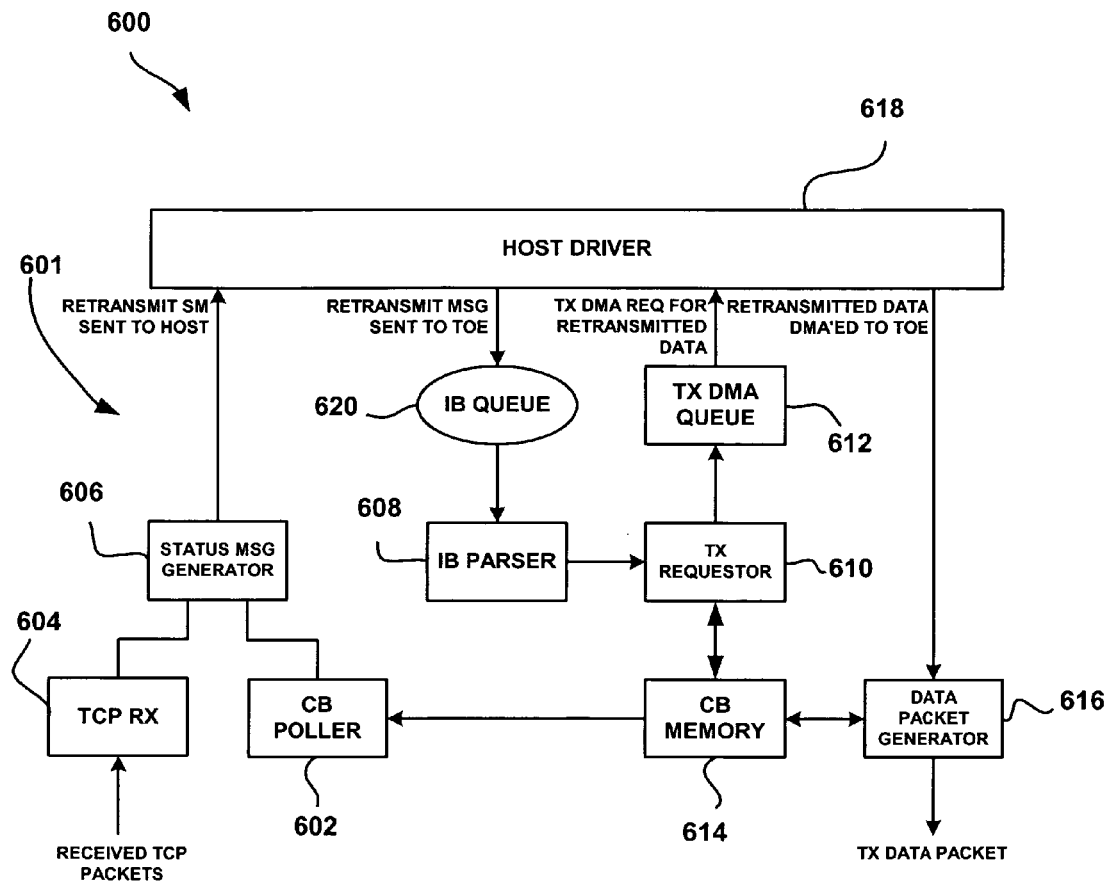
FIG. 6 illustrates an exemplary design and operation for handling retransmission requests, in accordance with an exemplary embodiment.

FIG. 6 illustrates an exemplary design and operation 600 for handling retransmission requests, in accordance with an exemplary embodiment. As an option, the design and operation 600 may be carried out in the context of the disclosure of the previous figures. Of course, however, it should be noted that the design and operation 600 may be implemented in any desired context. Most importantly, the exemplary design and operation 600 is set forth for illustrative purposes only, and should not be considered as limiting in any manner.

As shown, the exemplary design and operation 600 includes a host driver 618 associated with a processor which, in turn communicates with an offload engine 601 which comprising a plurality of exemplary components. For example, the offload engine 601 is shown to include a receiver 604, a CB poller 602, a status message generator 606, an instruction block (IB) queue 620, an IB parser 608, a transmission requestor 610, a DMA queue 612, CB memory 614, and a data packet generator 616, which are coupled as shown. The functionality of the various components will be set forth in greater detail hereinafter during a discussion of the use of the exemplary design and operation 600.

As shown, the CB poller 602 detects whether a socket needs retransmitting by examining a retransmit timestamp in the CB memory 614. A retransmit status message is then generated by the status message generator 606, and sent to the local host via the host driver 618. As previously mentioned, the status message may include the sequence number associated with the retransmit request, and is obtained from the last unacknowledged sequence number field from the CB memory 614. The status message may also include the retransmit data size associated with the retransmit request.

The local host (or the offload engine 601, for that matter) may maintain an SGL for the socket. When the local host receives the status message, the driver 618 may take the oldest buffer from the list and use that in the retransmit instruction message. As indicated earlier, if the amount of data in the oldest buffer is less than the retransmit data size requested by the remote host, the local host may include as many buffers in the retransmit instruction message as needed.

Since the local host is informed of all ACK advance events for the socket via status messages, it may also know if the remote host has partially ACK'ed data in the buffer. In this case, as explained previously, the local host may offset the starting address in the buffer by the appropriate amount. Table 3 illustrates an exemplary ACK status message format. Such format is set forth for illustrative purposes only, and should not be considered as limiting in any manner.

TABLE 3

| Ver | SB Length | SB Code | CB Handle [15:0] |
| --- | --- | --- | --- |
| | | ACK Number [31:0] | |

After the local host receives the status message, the local host generates a retransmit instruction message, which is sent to the offload engine 601 and queued locally in a buffer. See IB queue 620.

When the IB parser 608 receives the retransmit instruction message, it parses the instruction message and if it determines the type to be a retransmit instruction, it forwards the request to the transmission requestor 610. The transmission requestor 610 then retrieves the necessary parameters from the CB memory 614 and requests a DMA operation to retrieve the retransmit data from host memory. The DMA request may then be queued in a FIFO in the DMA queue 612. The DMA operation may be similar to a normal data transmit request. The sequence number from the retransmit instruction message, along with an additional bit may be sent along with the DMA request to indicate that the data request is for a retransmission.

When the DMA is complete, the data packet generator 616 is able to identify that the request is a retransmission request, because the retransmit bit is asserted along with a DMA data available indicator. When the data packet generator 616 encounters this, the data packet generator 616 may compare the sequence number for the retransmitted packet with the oldest unACK'ed sequence number in the CB memory 614. If there is a match, the retransmission is still valid and the packet is retransmitted. If the version of the sequence number in the CB memory 614 is greater than the sequence number for the retransmitted data, the remote host has ACK'ed all or part of the data in the time between when the retransmission request was made and when the DMA was completed. In this case, the data retransmission request may be aborted or continued depending on the amount of data acknowledged.

During use, retransmissions that are triggered by the reception of duplicate ACKs or a selective acknowledgement (SACK) option may also be instigated with a status message to the local host. From the local host viewpoint, it does not necessarily observe the difference between the different retransmission types. The receiver 604 may be equipped to request status messages for these cases. When the number of duplicate ACKs received threshold is reached, the receiver 604 may request a retransmit status message and set a duplicate ACK state bit in the socket CB memory 614. If it receives further duplicate ACKs and observes that this bit is still set, no further retransmissions are requested. When the data packet generator 616 sends the retransmitted packet, it may clear the foregoing bit.

When the receiver 604 receives packets from the remote host that contain the SACK option, it may also request a retransmit status message. Unlike the duplicate ACK case, a retransmit status message may be requested for every SACK option received. The retransmit data size is also known from the parameters received in the SACK options.

Figure 7:
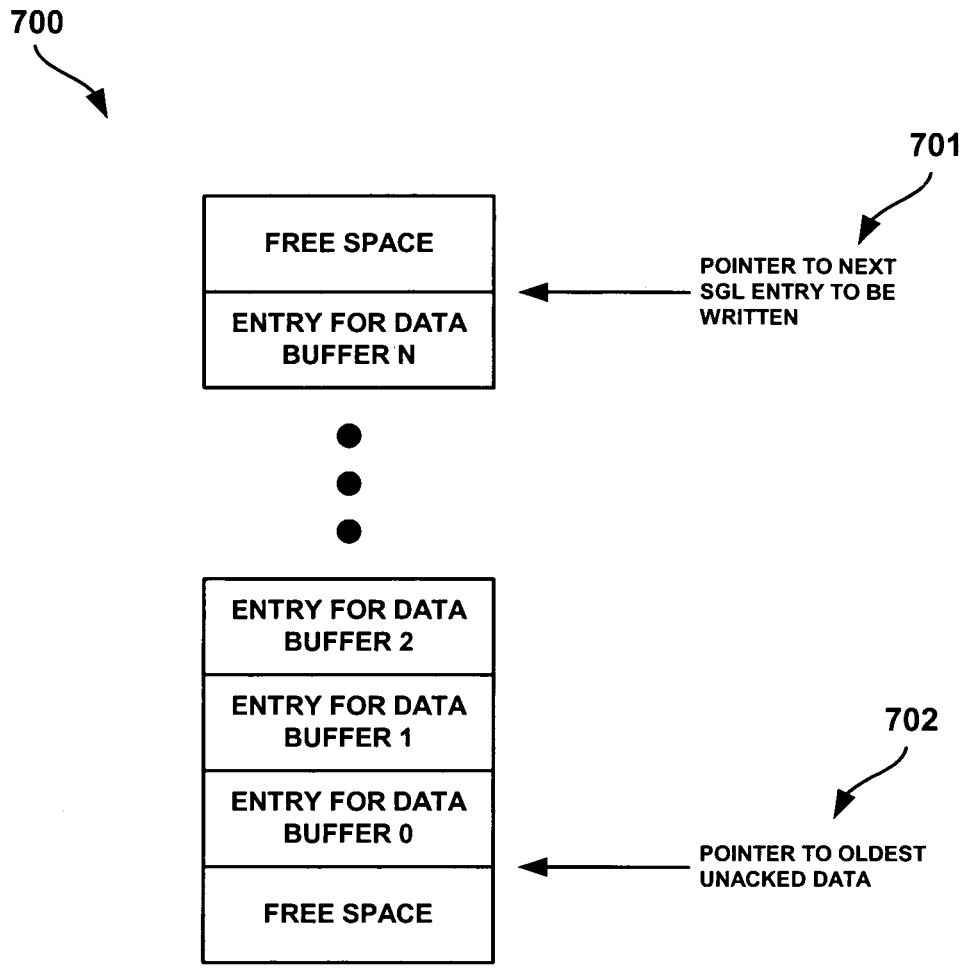
FIG. 7 illustrates an exemplary design of an SGL used to track data transmissions, in accordance with one embodiment.

FIG. 7 illustrates an exemplary design of an SGL list that is maintained for each socket. The SGL 700 contains a list of entries that specify the data that is transmitted on a socket.

Each SGL entry contains a pointer to a location in host memory where transmitted data is stored, along with the amount of data to be transmitted. Table 4 illustrates an exemplary SGL entry format. Such format is set forth for illustrative purposes only, and should not be considered as limiting in any manner.

TABLE 4

| Host Address where data is stored |
| --- |
| Amount of Data in SGL Entry to be transmitted |

Two pointers are maintained for each SGL. The first pointer indicates the location within the SGL where the next entry will be written. See 701. When more data is to be transmitted on the socket, the SGL location indicated by this pointer will be written with an SGL entry containing the host address where the data is located and how much data is to be transmitted.

The second pointer maintained for the SGL is a pointer to the oldest unacknowledged data buffer. See 702. This pointer is used to keep track of which data should be retransmitted when a retransmit status message is received. As the local host receives ACK status messages indicating how much data the remote host has successfully received, this pointer is incremented. When all the data in the oldest SGL entry has been acknowledged by the peer, the buffer indicated by the aforementioned entry may be freed and reused by the local host. In this manner, the local host can quickly locate the data to be retransmitted when it receives retransmit status messages.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An offload engine system for performing the retransmission of data in a network, comprising:
an offload engine in communication with system memory and a network,
wherein the offload engine manages the retransmission of data transmitted in the network;
wherein the offload engine transmits a status message to a processor to initiate retrieval of the data to be retransmitted, and the status message is transmitted based on a receipt of at least one acknowledgement or lack thereof;
wherein the offload engine is in communication with the processor and manages the retransmission of the data, by:
identifying the data to be retransmitted,
retrieving the data to be retransmitted that is stored in the system memory, and
retransmitting the retrieved data;
wherein the processor transmits a retransmit instruction message to the offload engine, in response to the status message;
wherein the offload engine transmits the status message to the processor utilizing a host driver associated with the processor and the host driver takes an oldest buffer from a buffer list to include in the retransmit instruction message.

2. The system as recited in claim 1, wherein the status message is transmitted based on a timeout.

3. The system as recited in claim 1, wherein the status message includes a handle for a control block for a socket.

4. The system as recited in claim 1, wherein the status message includes a sequence number.

5. The system as recited in claim 1, wherein the status message includes a retransmit data size.

6. The system as recited in claim 1, wherein the retransmit instruction message includes a sequence number.

7. The system as recited in claim 1, wherein the retransmit instruction message includes at least one pointer to at least one host buffer.

8. The system as recited in claim 7, wherein the pointer is maintained by the offload engine.

9. The system as recited in claim 7, wherein the pointer is maintained by the processor.

10. The system as recited in claim 7, wherein the retransmit instruction message includes an offset for use with the pointer to identify the data to be retransmitted.

11. The system as recited in claim 10, wherein the offset is included to specify a starting location in the buffer list for the data to be retransmitted.

12. The system as recited in claim 1, wherein the retransmit instruction message includes a handle for a control block for a socket.

13. The system as recited in claim 12, wherein the control block includes information associated with the data that is recently acknowledged.

14. The system as recited in claim 1, wherein the offload engine requests a direct memory access to retrieve the data to be retransmitted, in response to the retransmit instruction message.

15. The system as recited in claim 14, wherein the offload engine initiates a comparison involving a sequence number, in response to receipt of the data to be retransmitted.

16. The system as recited in claim 15, wherein the offload engine retransmits the data based on the comparison.

17. The system as recited in claim 1, wherein the offload engine transmits the status message to the processor to indicate that the acknowledgement for transmitted data has been received from a remote host.

18. The system as recited in claim 17, wherein the status message includes a handle for a control block for a socket.

19. The system as recited in claim 17, wherein the status message includes an acknowledgement number.

20. The system as recited in claim 1, wherein the system memory includes processor system memory coupled to the processor via a bus.

21. The system as recited in claim 1, wherein the system memory includes processor system memory that resides on the processor.

22. The system as recited in claim 1, wherein the offload engine includes a receiver, a poller, memory, a status message generator, an instruction block queue, an instruction block parser, a transmission requestor, a direct memory access queue, and a data packet generator.

23. An offload engine sub-system for performing the retransmission of data in a network, comprising:
    an offload engine in communication with a processor and a network,
    wherein the offload engine manages data transmitted in the network, by:
        identifying data to be retransmitted,
        retrieving the data to be retransmitted that is stored in processor system memory, and
        retransmitting the retrieved data;
    wherein the offload engine transmits a status message to the processor to initiate the retrieval of the data to be retransmitted, and the status message is transmitted based on a receipt of at least one acknowledgement or lack thereof;
    wherein the processor transmits a retransmit instruction message to the offload engine, in response to the status message;
    wherein the offload engine transmits the status message to the processor utilizing a host driver associated with the processor and the host driver takes an oldest buffer from a buffer list to include in the retransmit instruction message.

24. A method for performing the retransmission of data in a network, utilizing an offload engine, comprising:
    identifying data to be retransmitted;
    retrieving the data to be retransmitted that is stored in system memory, and
    retransmitting the retrieved data;
    wherein an offload engine transmits a status message to a processor to initiate the retrieval of the data to be retransmitted, and the status message is transmitted based on a receipt of at least one acknowledgement or lack thereof;
    wherein the offload engine is in communication with system memory and a network;
    wherein the offload engine manages the retransmission of data transmitted in the network;
    wherein the processor transmits a retransmit instruction message to the offload engine, in response to the status message;
    wherein the offload engine transmits the status message to the processor utilizing a host driver associated with the processor and the host driver takes an oldest buffer from a buffer list to include in the retransmit instruction message.

* * * * *